United States Patent
Liu et al.

(10) Patent No.: US 9,740,457 B1
(45) Date of Patent: Aug. 22, 2017

(54) METHOD AND APPARATUS FOR DISPLAYING TIMELINE OF SOFTWARE DEVELOPMENT DATA

(71) Applicant: CA, Inc., Islandia, NY (US)

(72) Inventors: Kevin Liu, Beijing (CN); Bolt Zhang, Beijing (CN); Shichao Wang, Beijing (CN); Tony Shen, Beijing (CN)

(73) Assignee: CA, Inc., New York, NY (US)

( * ) Notice: Subject to any disclaimer, the term of this patent is extended or adjusted under 35 U.S.C. 154(b) by 313 days.

(21) Appl. No.: 14/187,462

(22) Filed: Feb. 24, 2014

(51) Int. Cl.
*G06F 9/44* (2006.01)
*G06Q 10/06* (2012.01)
*G06F 11/36* (2006.01)

(52) U.S. Cl.
CPC ............ *G06F 8/00* (2013.01); *G06F 11/36* (2013.01); *G06Q 10/06* (2013.01)

(58) Field of Classification Search
None
See application file for complete search history.

(56) References Cited

U.S. PATENT DOCUMENTS

| | | | | |
|---|---|---|---|---|
| 6,842,782 B1* | 1/2005 | Malik | ............... | G06F 17/3089 707/999.01 |
| 7,788,295 B2* | 8/2010 | Wall et al. | ............... | 707/804 |
| 8,063,904 B2* | 11/2011 | Lynam | ............... | 345/440 |
| 8,225,270 B2* | 7/2012 | Frasher et al. | ............... | 717/101 |
| 8,335,705 B2* | 12/2012 | Ehrler et al. | ............... | 705/7.15 |
| 8,539,282 B1* | 9/2013 | Kabanov | ............... | G06F 11/3688 702/182 |
| 8,713,531 B1* | 4/2014 | Pettis | ............... | G06F 11/3688 717/100 |
| 2005/0114829 A1* | 5/2005 | Robin | ............... | G06Q 10/06 717/101 |
| 2007/0168918 A1* | 7/2007 | Metherall et al. | ............ | 717/101 |
| 2007/0174432 A1* | 7/2007 | Rhee | ............... | H04M 1/72522 709/219 |
| 2009/0199113 A1* | 8/2009 | McWhinnie | ........... | G06Q 10/06 715/762 |
| 2009/0293074 A1* | 11/2009 | Rohwer | ............... | 719/328 |
| 2010/0185932 A1* | 7/2010 | Coffman | ............... | G06Q 10/10 715/230 |
| 2012/0096425 A1* | 4/2012 | Gupta et al. | ............... | 717/101 |
| 2014/0013307 A1* | 1/2014 | Hansson | ............... | G06F 11/3692 717/124 |
| 2014/0095425 A1* | 4/2014 | Sipple | ............... | G06N 7/005 706/52 |

(Continued)

*Primary Examiner* — Isaac T Tecklu
(74) *Attorney, Agent, or Firm* — Coats & Bennett, PLLC

(57) ABSTRACT

According to one aspect of the present disclosure, a computer-implemented method is disclosed. From a plurality of data sources, software development data is obtained that relates to development of a software application and includes a time and description of multiple types of events that occurred during a predefined time period during development of the software application. A view selection of one of a plurality of views is received, wherein each view has a respective predefined timeline display template. The software development data is formatted according to the predefined timeline display template of the view selection to obtain a timeline of the software development data. The timeline of the software development data is displayed on an electronic display.

15 Claims, 7 Drawing Sheets

(56) References Cited

U.S. PATENT DOCUMENTS

2014/0173737 A1\* 6/2014 Toback .................. G06F 21/57
726/25
2014/0344004 A1\* 11/2014 Surendran ........ G06Q 10/06316
705/7.26

\* cited by examiner

| | | | | | |
|---|---|---|---|---|---|
| BUGS | NEW: 6<br>CLOSE: 4<br>OPEN: 5<br>FIXED: 12 | NEW: 1<br>CLOSE: 5<br>OPEN: 3<br>FIXED: 4 | NEW: 2<br>CLOSE: 1<br>OPEN: 6<br>FIXED: 6 | NEW: 0<br>CLOSE: 5<br>OPEN: 1<br>FIXED: 1 | . . . |
| BUILDS | TOTAL BUILDS: 7<br>FAILED: 1 | TOTAL BUILDS: 8<br>FAILED: 0 | TOTAL BUILDS: 5<br>FAILED: 3 | TOTAL BUILDS: 6<br>FAILED: 1 | . . . |
| TEST CASES | DESIGN: 12 CASES<br>EXECUTE: 32 CASES | DESIGN: 8 CASES<br>EXECUTE: 17 CASES | DESIGN: 20 CASES<br>EXECUTE: 11 CASES | DESIGN: 1 CASES<br>EXECUTE: 28 CASES | . . . |
| CHECK-INS | 4 CHECK-INS<br>31 FILES<br>FOR 2 USER STORIES<br>FOR 2 BUGS | 5 CHECK-INS<br>9 FILES<br>FOR 1 USER STORY<br>FOR 4 BUGS | 2 CHECK-INS<br>17 FILES<br>FOR FIXING BUILD<br>FOR 2 BUGS | 4 CHECK-INS<br>7 FILES<br>FOR 1 USER STORY<br>FOR 3 BUGS | . . . |
| USER STORY | ADD: 4<br>CHANGE: 1<br>DELETE: 1 | ADD: 0<br>CHANGE: 2<br>DELETE: 0 | ADD: 1<br>CHANGE: 1<br>DELETE: 0 | ADD: 2<br>CHANGE: 0<br>DELETE: 1 | . . . |
| | DAY 1 | DAY 2 | DAY 3 | DAY 4 | |

FIG. 3

DAY 1 (07/13/2013) — 30B

| TIME | ACTIVITY |
|---|---|
| 09:13:17 | BOLT CHECKED IN 11 FILES FOR USER STORY XXX |
| 11:20:03 | TONY CHECKED IN 8 FILES FOR USER STORY YYY |
| 11:34:07 | START DEV BUILD 423.871, FAILED |
| 13:51:22 | SHICHAO CHECKED IN 5 FILES FOR BUG 22384 |
| 13:53:14 | JUSTIN CREATED TEST CASE 33542 FOR USER STORY XXX |
| 13:59:52 | JUSTIN CREATED TEST CASE 33543 FOR USER STORY XXX |
| 14:05:11 | JUSTIN CREATED TEST CASE 33545 FOR USER STORY XXX |
| 14:06:01 | LINA CREATED TEST CASE 33544 FOR USER STORY YYY |
| 14:13:15 | BOLT CHECKED IN 3 FILES FOR BUG 22514 |
| 14:13:27 | START DEV BUILD 423.872, SUCCESSFULLY |
| 14:27:11 | JUSTIN EXECUTED TEST CASE 33212 |
| 14:29:30 | LINA EXECUTED TEST CASE 33159 |
| 14:39:43 | JUSTIN EXECUTED TEST CASE 33213 |
| . . . | . . . |

FIG. 4

METHOD AND APPARATUS FOR DISPLAYING TIMELINE OF SOFTWARE DEVELOPMENT DATA

TECHNICAL FIELD

The present disclosure relates to software development data, and more particularly to displaying a timeline of software development data.

BACKGROUND

"Scrum" refers to an agile software development technique which aims to deliver products iteratively and incrementally, while maximizing opportunities for feedback. One significant difference between Scrum and more traditional software development is that Scrum is designed to effectively accommodate changing requirements, even at a late stage of development. To define various objectives in Scrum, so-called "user stories" are often used. User stores provide a quick way of describing customer requirements without having to create formalized requirements documents. Utilizing concise user stories helps to facilitate fast responses to rapidly changing requirements with less overhead. An example user story could be, for example, "as a user closing the application, I want to be prompted to save if I have made any change in my data since the last save." Another example user story could include "as a buyer, I want to see all the products I chose in my shopping cart" or "as a seller, I want to see a list and quantity of all the products sold in a history page." Thus, user stories typically identify a type of user, and a feature that the user would expect to see in a certain place and/or at a certain time.

A primary defining characteristic of Scrum is the so-called "sprint" which is a basic unit of development corresponding to a limited period of time (e.g., between two weeks and a month) during which Scrum teams aim to achieve a clearly-defined objective. Given their defined duration, sprints are described as being "time-boxed." By adopting the iterative and incremental approach of sprints, software developers have found the Scrum technique to be an effective framework for software development in a group setting.

During a given sprint, a "daily Scrum" (also known as a "daily stand-up") is typically conducted on a daily basis to review how a accomplishments from a preceding day advanced the sprint goal, to review goals of the current work day, and/or to review any impediments to meetings those goals. These daily meetings are themselves time-boxed (often limited to 15 minutes), and a white board is often used to facilitate group communication.

SUMMARY

According to one aspect of the present disclosure, a computer-implemented method is disclosed. From a plurality of data sources, software development data is obtained that relates to development of a software application and includes a time and description of multiple types of events that occurred during a predefined time period during development of the software application. A view selection of one of a plurality of views is received, wherein each view has a respective predefined timeline display template. The software development data is formatted according to the predefined timeline display template of the view selection to obtain a timeline of the software development data. The timeline of the software development data is displayed on an electronic display.

According to another aspect of the present disclosure, a computing device is disclosed that includes a communication interface and a controller. The controller is configured to obtain, from a plurality of data sources, software development data that relates to development of a software application and includes a time and description of multiple types of events that occurred during a predefined time period during development of the software application. The controller is further configured to receive, via the communication interface, a view selection of one of a plurality of views, wherein each view has a respective predefined timeline display template. The controller is further configured to format the software development data according to the predefined timeline display template of the view selection to obtain a timeline of the software development data, and display the timeline of the software development data on an electronic display.

According to another aspect of the present disclosure, a computer program product is disclosed that comprises a computer readable storage medium having computer readable program code embodied therewith. The computer readable program code comprises computer readable program code configured to obtain, from a plurality of data sources, software development data that relates to development of a software application and includes a time and description of multiple types of events that occurred during a predefined time period during development of the software application. The computer readable program code further comprises computer readable program code configured to receive a view selection of one of a plurality of views, wherein each view has a respective predefined timeline display template. The computer readable program code further comprises computer readable program code configured to format the software development data according to the predefined timeline display template of the view selection to obtain a timeline of the software development data. The computer readable program code further comprises computer readable program code configured to display the timeline of the software development data on an electronic display.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

FIG. 3 illustrates a first example timeline of software development data.

FIG. 4 illustrates a second example timeline of software development data.

DETAILED DESCRIPTION

Figure 1:
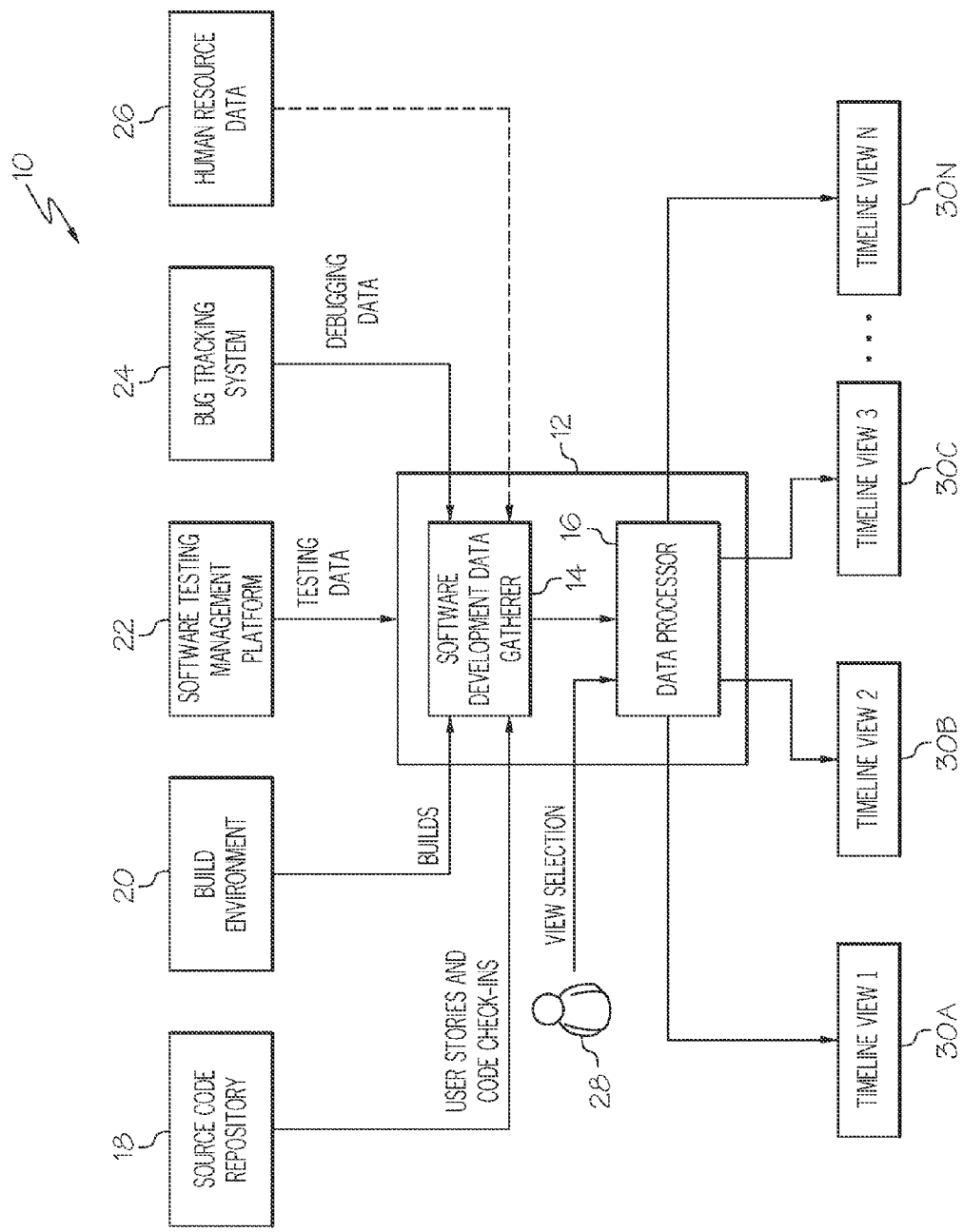
FIG. 1 schematically illustrates an example system for gathering and displaying a software development data in various timeline formats.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure describes a system 10 for gathering and displaying software development data, which can be particularly useful in connection with "Scrum" software development. Software development data (e.g., source code repository access data, debugging data, software testing data, etc.) is gathered. The gathered software development data is formatted to obtain a timeline of the software development data. This enables users to display the software development data in a timeline format most suitable for their needs.

FIG. 1 schematically illustrates an example system 10 for gathering and displaying development data in various timeline formats. A computing device 12 includes two main functional components: a software development data gatherer 14 and a data processor 16. These may be implemented by the same, or by multiple, processing circuits. The software development data gatherer obtains software development data from a plurality of data sources 18-24. The obtained software development data relates to development of a software application and includes a time and description of multiple types of events that occurred during a predefined time period during development of the software application (e.g., a 24 hour time period). In one or more embodiments, each data source includes data for different types of events. As discussed below in greater detail, in some embodiments human resource data 26 is also gathered.

In one implementation of the system 10 of FIG. 1, the software development data includes a plurality of source code repository access data (e.g., code check-ins), software debugging data, software testing data, and software build data (e.g., compiler data), and user story data. In one or more embodiments, the data gathering of the software development data (and optionally human resource data 26) is automatically performed on a periodic basis, and integrates with a number of different systems (e.g., the plurality of data sources 18-26 shown in FIG. 1).

Referring still to FIG. 1, source code repository 18 is a data source that includes data describing source code check-ins. Some example source code check-in data may include a quantity of check-ins occurring within the predefined time period, a quantity of files checked in, which user(s) performed check-ins, which use stories the check-ins relate to, which bugs the check-ins relate to, Scrum user stories, etc. Various combinations of these examples of source code check-in data may be gathered by the computing device 12. In one example, the source code repository 18 includes the "Rational Team Concert" (RTC) product from IBM. Of course, this is only an example, and it is understood that other source code repositories could be used as a data source.

Build environment 20 is a data source that includes data describing software builds (e.g., compilation) of source code. Some example source code build data may include a quantity of builds occurring within the predefined time period, a quantity of successful builds within the predefined time period, and a quantity of failed builds within the predefined time period. Various combinations of these examples of software build data may be gathered by the computing device 12. In one example, the build environment 20 includes TEAMCITY from JETBRAINS. Of course, this is only an example, and it is understood that other build environments could be used as a data source.

Software testing management platform 22 is a data source that includes data describing software testing. Some example software testing data may include a quantity of test cases created within the predefined time period, a quantity of test cases executed within the predefined time period, a quantity of tests successfully completed within the predefined time period, and a quantity of tests that failed during the predefined time period. Various combinations of these examples of software testing data may be gathered by the computing device 12. In one example, the software testing management platform 20 includes "Quality Center" from HEWLETT-PACKARD (which is now known as "Application Life Cycle Management," hereinafter QC/ALM). Of course, this is only an example, and it is understood that other software testing management platforms could be used as a data source.

Bug tracking system 24 is a data source includes data describing bugs in a given software application. Some example bug data may include a quantity of new bugs opened in the predefined time period, a quantity of bugs closed in the predefined time period, a quantity of bugs remaining open during the predefined time period, and a quantity of bugs fixed during the predefined time period. Various combinations of these examples of software testing data may be gathered by the computing device 12. In one example, the bug tracking system 24 includes QC/ALM. Thus, it is possible that some of the plurality of data sources 18-24 may correspond to a single data source (e.g., QC/ALM being both the software testing management platform 22 and the bug tracking system 24). Of course, this is only an example, and it is understood that other bug tracking systems could be used as a data source.

In some embodiments, the computing device 12 optionally also gathers data from a human resource data source 26 to determine, for example, when a given software developer will be working or not working (e.g., vacation or sick time), when the software developer is available/unavailable (e.g., when participating in meetings), and/or how many hours the software developer has logged for a given project or task. In one example, the human resource data source 26 includes MICROSOFT OUTLOOK, "Clarity" from CA Technologies, or both. Of course, it is understood that these are only examples, and it is understood that other human resource data sources could be used as a data source.

Also, although the data sources 18-26 are shown in FIG. 1, it is understood that not all of these data sources would be required. Also, it is understood that additional types of data sources could be include in addition to, or as an alternative to, some of the data sources 18-26.

In addition to gathering data from a plurality of the data sources 18-26, the computing device 12 also receives a view selection from a user 28. The view selection indicates one of a plurality of available timeline views, each having a respective predefined timeline display template. Upon receiving the view selection, the computing device 12 formats the gathered software development data according to the predefined timeline display template of the view selection to obtain a timeline 30 of the software development data. The obtained timeline is then displayed on an electronic display.

Figure 2:
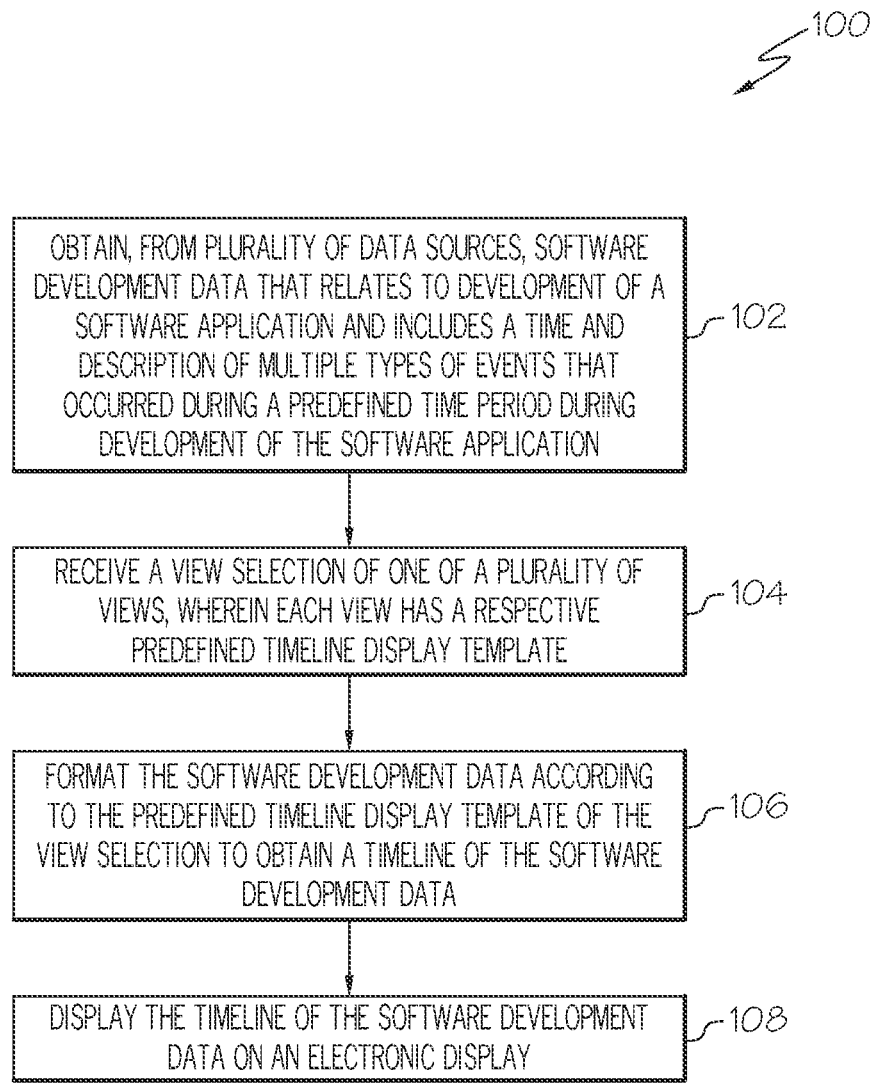
FIG. 2 illustrates an example computer-implemented method for displaying a timeline of software development data.

FIG. 2 illustrates an example computer-implemented method 100 for displaying a timeline of software development on an electronic display. The computing device 12 obtains, from a plurality of data sources (e.g., 18-24), software development data that relates to development of a software application and includes a time and description of multiple types of events that occurred during a predefined time period during development of the software application (block 102). The computing device 12 receives a view selection of one of a plurality of views, wherein each view has a respective predefined timeline display template (block 104). The computing device 12 formats the software development data according to the predefined timeline display template of the view selection to obtain a timeline 28 of the software development data (block 106), and displays the timeline 28 of the software development data on an electronic display.

In one embodiment, block 106 refers to displaying the timeline 28 on display operatively connected to a graphics output of the computing device 12 (e.g., a video card output). In another embodiment, block 106 refers to transmitting the timeline 28 for display on a remote computing device. In such embodiments, the computing device 12 may act as a web server that displays the timeline on a remote device by transmitting the formatted timeline to a remote device via an Internet Protocol "IP" connection, for example. Thus, the displaying of block 106 can refer to either displaying on a wired or wirelessly connected display, or transmitting the display data to another computing device for display.

Various example timelines will now be described in greater detail, in connection with FIGS. 3-6. FIG. 3 illustrates a first example timeline 30A in which a tabular arrangement of events is presented, and in which event types are displayed along a first axis (e.g., a vertical axis) and predefined time periods are displayed along a perpendicular second axis (e.g., a horizontal axis), such that a cell for a given event type in a given predefined time period displays a quantity of events of the given event type occurring within the given predefined time period. For example, the "Builds" cell for "Day 1" indicates that a total of 7 builds were attempted, and that 1 of those builds failed. As an additional example, the "Test Cases" cell for "Day 4" indicates that 1 new test case was designed, and that 28 test cases were executed. As shown in FIG. 3, the timeline may illustrate data from a plurality of the predefined time periods (e.g., a plurality of days). In the example of FIG. 3, the displayed event types include "Bugs," "Builds," "Test Cases," "Check-ins," and "User Story." Thus, in some embodiments the various "event types" serve as event categories, such that creation of a test case and execution of a test case could quality as a same "type" of event.

FIG. 4 illustrates a second example timeline 30B in which events of multiple types are combined into a single list in which the events are displayed sequentially in an order of occurrence and a time and description of each event is displayed. In the example of FIG. 4, the predefined time period is a single day (shown as "Day 1"). In one example, the timeline 30B of FIG. 4 may be presented in a tabbed view, such that "Day 1" would be a selectable tab, and other tabs would be available for other predefined time periods (e.g., a "Day 2" tab, a "Day 3" tab, etc.).

Figure 5:
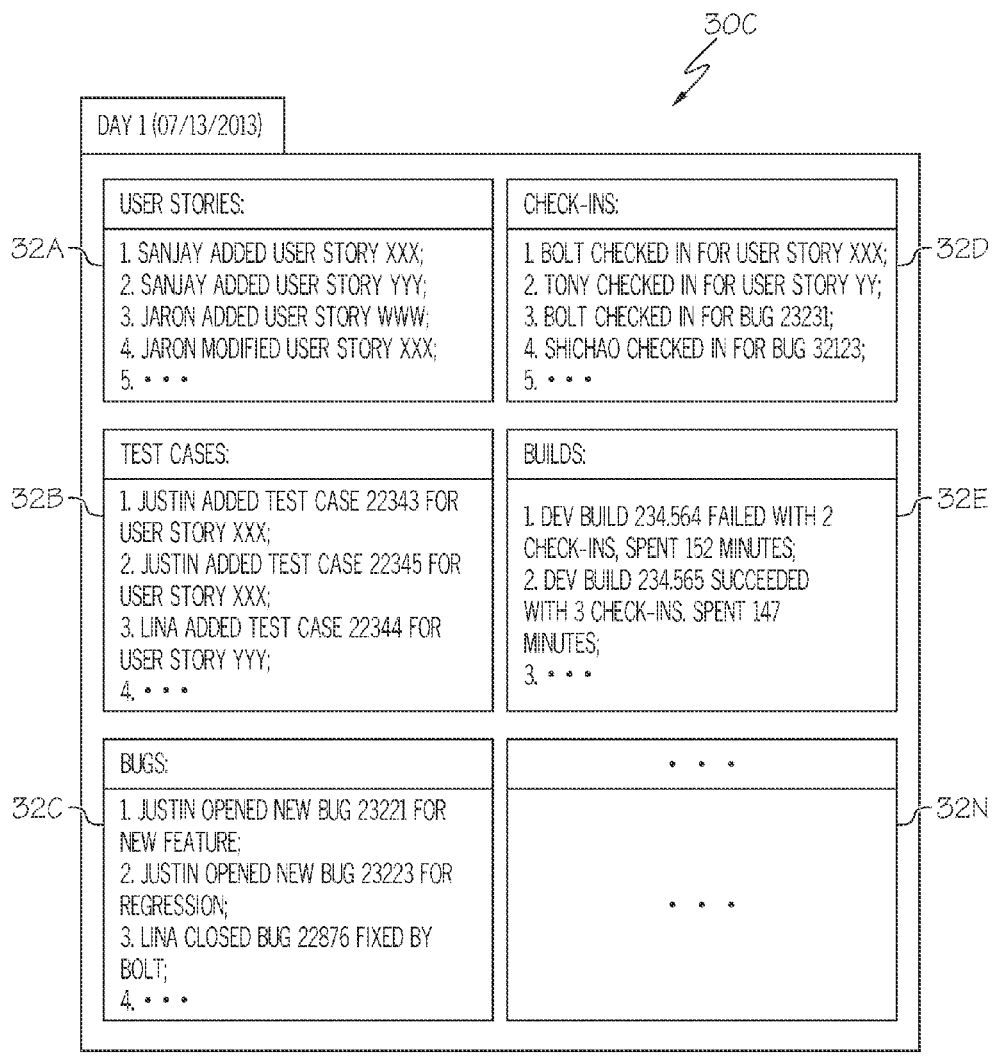
FIG. 5 illustrates a third example timeline of software development data.

FIG. 5 illustrates a third example timeline 30C in which multiple lists 32 of events are displayed, each list corresponding to a single event type and sequentially displaying event descriptions for each event of its type occurring within the predefined time period in an order of their occurrence. Optionally, the time of occurrence may also be listed. Thus, the "User Stories" list 32A only includes information relating to user stories, the "Test Cases" list 32B only includes information relating to test cases, etc. In one example, the timeline 30C of FIG. 5 may be presented in a tabbed view, such that "Day 1" would be a selectable tab, and other tabs would be available for other predefined time periods (e.g., a "Day 2" tab, a "Day 3" tab, etc.).

Figure 6:
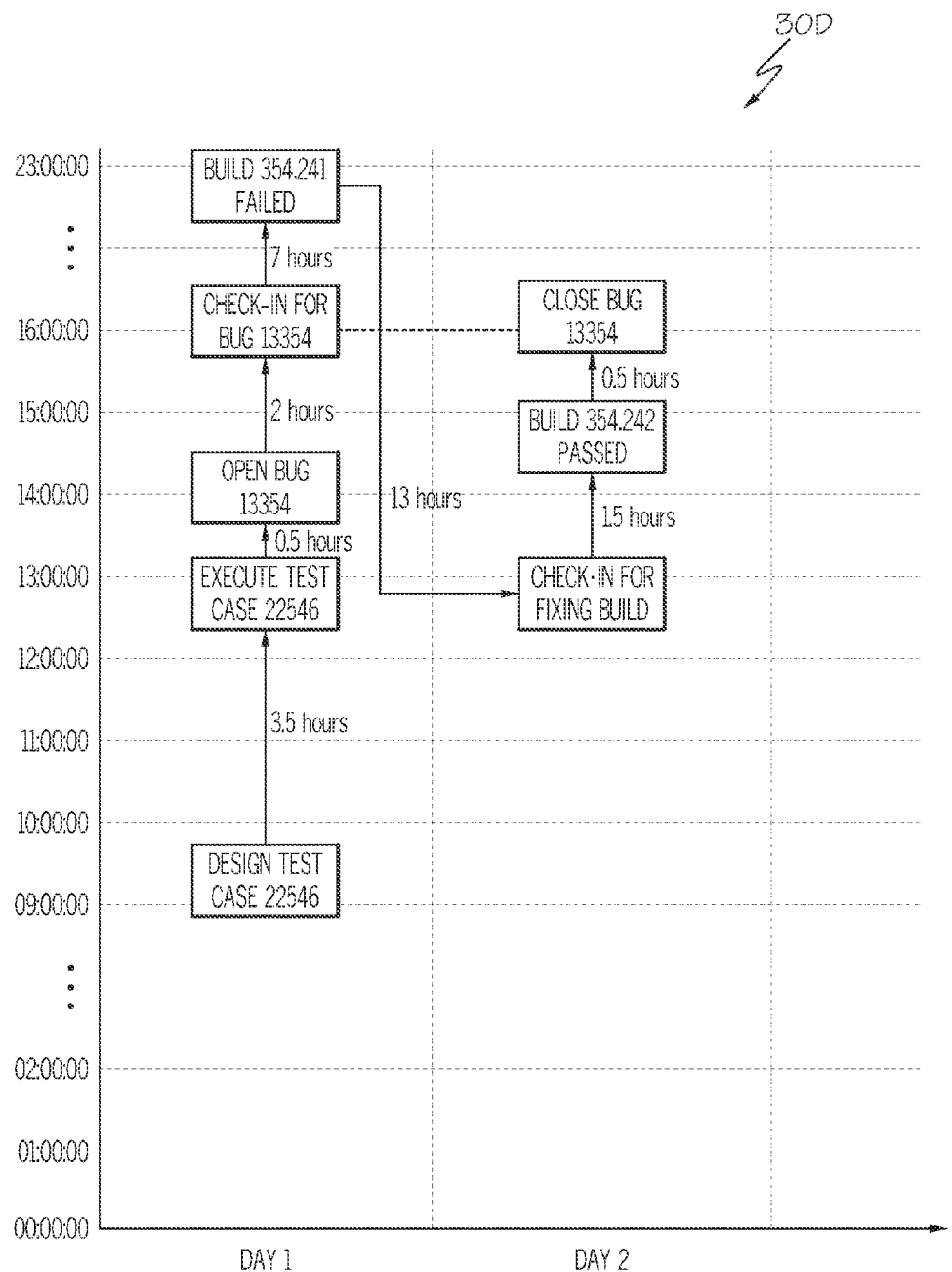
FIG. 6 illustrates a fourth example timeline of software development data.

FIG. 6 illustrates a fourth example timeline 30D in which a combined listing of events of multiple types is presented, and in which consecutive events are spaced apart by a distance indicative of an amount of time transpiring between the consecutive events. For example, the events "Design Test Case 22546" and "Execute Test Case 22546" are spaced apart by an amount of space indicative of 3.5 hours of time, while the events "Execute Test Cast 22546" and "Open Bug 13354" are spaced apart by a smaller amount of space indicative of 0.5 hours. As shown in FIG. 6, multiple types of events are presented in a single list, such as testing data (e.g., "Design Test Case 22546"), debugging data (e.g., "Open Bug 13354"), and build data (e.g., "Build 354.242 passed"). While four different example timelines 30A-D have been shown, it is understood that these are non-limiting examples, and that other types of timelines could be used.

According to one aspect of the present disclosure, certain events may be characterized as "show stoppers." For example, in FIG. 6 if a duration of time transpiring between "Open Bug 13354" and "Close Bug 13354" is considered to be too long (e.g., if it exceeds a predefined time threshold) then the bug 13354 may be characterized as a "show stopper" in the system 10. In one or more embodiments, show stopper data can be emphasized in the various timelines 30 (e.g., highlighted, shown in bold, shown in a different font color, etc.) to call attention to the show stopper during a daily stand-up meeting. This could be used to facilitate discussion of the "show stopper" to determine why it occurred, and to determine how to avoid additional "show stoppers."

Figure 7:
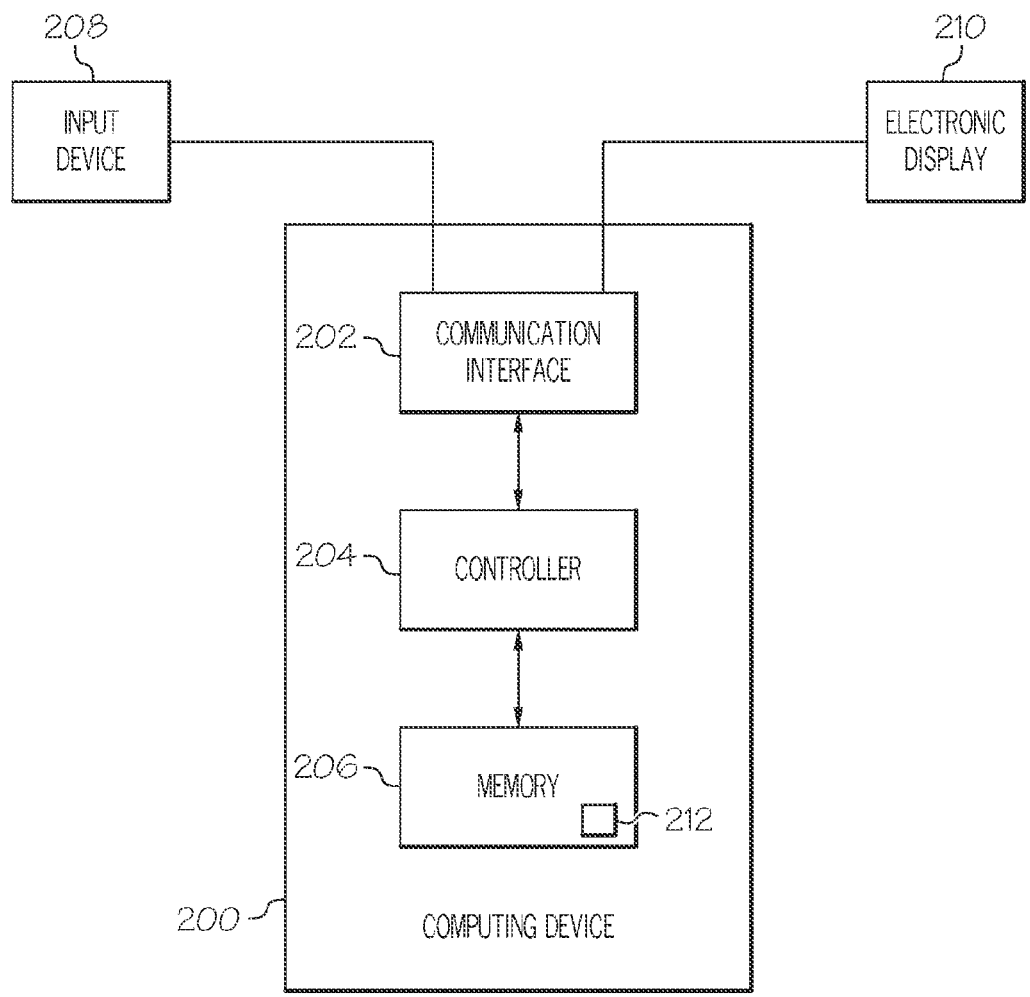
FIG. 7 illustrates an example computing device operative to implement the method of FIG. 2.

FIG. 7 illustrates an example computing device 200 operative to implement the method of FIG. 2, and that may be used as the computing device 12 of FIG. 1. The computing device 200 includes a communication interface 202, a controller 204, and a computer readable storage medium (shown as "memory" 206). The controller 204 is configured to obtain, from a plurality of data sources (e.g., sources 18-24), software development data that relates to development of a software application and includes a time and description of multiple types of events that occurred during a predefined time period during development of the software application. This obtaining may be performed using the communication interface 202, for example. The obtained software development data may be stored in the memory 206. The controller 204 is further configured to receive, via the communication interface 202, a view selection of one of a plurality of views, wherein each view has a respective predefined timeline display template. In one example, the view selection is received from an input device 208 in wired or wireless communication with the communication interface 202. The controller 204 is further configured to format the software development data according to the predefined timeline display template of the view selection to obtain a timeline of the software development data, and to display the timeline of the software development data on an electronic display (e.g., on electronic display 210). In some embodiments, the views and their respective predefined time line display templates are stored in the memory 206.

In one embodiment, the memory 206 includes a computer program product 212 that comprises computer readable program code that configures the computing device 200 to implement the method 100. Thus, the computer readable program code configures the computing device 200 to obtain, from a plurality of data sources, software development data that relates to development of a software application and includes a time and description of multiple types of events that occurred during a predefined time period during development of the software application. The computer program code also configures the computing device 200 to receive a view selection of one of a plurality of views, wherein each view has a respective predefined timeline display template; format the software development data according to the predefined timeline display template of the view selection to obtain a timeline of the software development data; and display the timeline of the software development data on an electronic display.

As discussed above, the "daily stand-up" is often an integral part of Agile software development (e.g., using Scrum techniques). The techniques described above provide for a centralized location for software development data for the daily stand-up, and also provide for an effective display of the data for the daily stand-up. Using whiteboards is an error-prone and time-consuming process. By automatically gathering data and providing a number of useful timeline display templates, the daily stand-up can be conducted very effectively.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
obtaining, from a plurality of data sources, software development data that relates to development of a software application and includes a time and description of multiple types of events that occurred during a predefined time period during development of the software application;
receiving user input identifying a selected view, wherein the selected view is selected by a user from a plurality of views, and wherein each view defines a respective predefined timeline display template;
creating, from the software development data, a timeline of the software development data formatted according to the predefined timeline display template of the selected view;
determining whether an event represented in the software development data indicates an obstacle to further progress on the development of the software application;
responsive to determining that an event represented in the software development data indicates an obstacle to further progress on the development of the software application, formatting information associated with the event on the timeline of the software development data to visually indicate the event to the user; and
outputting the timeline of the software development data to an electronic display;
wherein the predefined timeline display template of a first of the plurality of views comprises a plurality of selectable tabbed views, with each selectable tabbed view in the predefined timeline display template corresponding to a predefined time period and comprising a plurality of self-contained event lists, each self-contained event list corresponding to a respective single event type, and sequentially displaying event descriptions for each event of its type occurring within the predefined time period in order of occurrence.

2. The computer-implemented method of claim 1, wherein the software development data includes a plurality of: source code repository access data, software debugging data, software testing data, software build data, and user story data.

3. The computer-implemented method of claim 2, wherein the plurality of data sources include a software testing management platform, a build environment of the software application, a source code repository of the software application, a bug tracking system, or a combination thereof.

4. The computer-implemented method of claim 1, wherein the predefined timeline display template of a second of the plurality of views comprises a plurality of selectable tabbed views, with each selectable tabbed view comprising a single list that displays:
multiple events of different event types sequentially in an order of occurrence;
a time in which each event occurred; and
a description of each event.

5. The computer-implemented method of claim 1, wherein the predefined timeline display template of a second of the plurality of views comprises a combined listing of events of multiple event types with consecutive events being spaced apart by a distance indicative of an amount of time transpiring between the consecutive events.

6. A computing device comprising:
memory;
a communication interface; and
processing circuitry operatively connected to the memory and communication interface and configured to:
obtain, from a plurality of data sources, software development data that relates to development of a software application and includes a time and description of multiple types of events that occurred during a predefined time period during development of the software application;
receive, via the communication interface, user input identifying a selected view, wherein the selected view is selected by a user from a plurality of views, and wherein each view defines a respective predefined timeline display template;
create, from the software development data, a timeline of the software development data formatted according to the predefined timeline display template of the selected view;

determine whether an event represented in the software development data indicates an obstacle to further progress on the development of the software application;

responsive to determining that an event represented in the software development data indicates an obstacle to further progress on the development of the software application, format information associated with the event on the timeline of the software development data to visually indicate the event to the user; and output the timeline of the software development data to an electronic display;

wherein the predefined timeline display template of a first of the plurality of views comprises a plurality of selectable tabbed views, with each selectable tabbed view in the predefined timeline display template corresponding to a predefined time period and comprising a plurality of self-contained event lists, each self-contained event list corresponding to a respective single event type, and sequentially displaying event descriptions for each event of its type occurring within the predefined time period in order of occurrence.

7. The computing device of claim 6, wherein the software development data includes a plurality of: source code repository access data, software debugging data, software testing data, software build data, and user story data.

8. The computing device of claim 7, wherein the plurality of data sources include a software testing management platform, a build environment of the software application, a source code repository of the software application, a bug tracking system, or a combination thereof.

9. The computing device of claim 6, wherein the predefined timeline display template of a second of the plurality of views comprises a plurality of selectable tabbed views, with each selectable tabbed view comprising a single list that displays:

multiple events of different event types sequentially in an order of occurrence;
a time in which each event occurred; and
a description of each event.

10. The computing device of claim 6, wherein the predefined timeline display template of a second of the plurality of views comprises a combined listing of events of multiple event types with consecutive events being spaced apart by a distance indicative of an amount of time transpiring between the consecutive events.

11. A computer program product comprising:

a non-transitory computer readable storage medium having computer readable program code embodied therewith that, when executed by a processing circuit of a computer device, causes the processing circuit to:

obtain, from a plurality of data sources, software development data that relates to development of a software application and includes a time and description of multiple types of events that occurred during a predefined time period during development of the software application;

receive a user input identifying a selected view, wherein the selected view is selected by a user from a plurality of views, and wherein each view defines a respective predefined timeline display template;

create, from the software development data, a timeline of the software development data formatted according to the predefined timeline display template of the selected view;

determine whether an event represented in the software development data indicates an obstacle to further progress on the development of the software application;

responsive to determining that an event represented in the software development data indicates an obstacle to further progress on the development of the software application, format information associated with the event on the timeline of the software development data to visually indicate the event to the user; and output the timeline of the software development data to an electronic display;

wherein the predefined timeline display template of a first of the plurality of views comprises a plurality of selectable tabbed views, with each selectable tabbed view in the predefined timeline display template corresponding to a predefined time period and comprising a plurality of self-contained event lists, each self-contained event list corresponding to a respective single event type, and sequentially displaying event descriptions for each event of its type occurring within the predefined time period in order of occurrence.

12. The computer program product of claim 11, wherein the software development data includes a plurality of: source code repository access data, software debugging data, software testing data, software build data, and user story data.

13. The computer program product of claim 12, wherein the plurality of data sources include a software testing management platform, a build environment of the software application, a source code repository of the software application, a bug tracking system, or a combination thereof.

14. The computer program product of claim 11, wherein the predefined timeline display template of a second of the plurality of views comprises a plurality of selectable tabbed views, with each selectable tabbed view comprising a single list that displays:

multiple events of different event types sequentially in an order of occurrence;
a time in which each event occurred; and
a description of each event.

15. The computer program product of claim 11, wherein the predefined timeline display template of a second of the plurality of views comprises a combined listing of events of multiple event types with consecutive events being spaced apart by a distance indicative of an amount of time transpiring between the consecutive events.

* * * * *